though the conversion of a nucleus where it is directly reactive or even as a variable.

2,875,165

METHOD OF ESTERIFYING EPOXY RESINS WITH UNSATURATED ACIDS

Wesley C. Stoesser, Midland, Edmund H. Sommerfield, Bay City, and William R. Surine, Midland, Mich., assignors to The Dow Chemical Company, Midland, Mich., a corporation of Delaware No Drawing. Application February 2, 1956
Serial No. 562,947

6 Claims. (Cl. 260—18)

This invention relates to an improved method for esterifying epoxy resins with drying and semi-drying oil acids, whereby the ester product is obtained in a gel-free condition and with freedom from discoloration.

The epoxy resins are liquid or solid reaction products of polyhydric phenols or of polyhydric alcohols with epihalohydrins, polyhalohydrins or polyepoxides. Such resins have reactive epoxy groups, i. e., oxirane rings, which function in an esterification reaction like dihydric alcohols. When epoxy resins are caused to react with the unsaturated drying or semi-drying monocarboxylic acids, a synthetic drying or semi-drying oil is formed. Such oils are useful as varnishes or as constituents of varnishes.

It has been found that the varnishes made from epoxy resins cannot always be carried, in the course of their production, to a satisfactorily low acid number. Thus, it occurs frequently that the esterification reaction produces a gel before the acid number of the reaction mixture has been reduced to a value below 1. Such gels are useless for coating purposes. It has been noted as well that esterification of epoxy resins, especially those common ones made from 4,4'-dihydroxy diphenyl dimethyl methane ("bisphenol-A") tend to exhibit an objectionable green color which may become quite dark during the esterification reaction.

It would be desirable, and it is the principal object of this invention to provide a method whereby epoxy resins may be esterified with drying and semi-drying acids and the reaction may be carried essentially to completion without gel formation and without the described objectionable discoloration.

It has now been found that the foregoing and related objects are attained by carrying out the esterification of the epoxy resins in the presence of trace amounts of an organic chelating agent. The useful agents are numerous and have various structures. Illustrative examples include the tri- and tetrasodium salts of ethylenediamine tetraacetic acid, the sodium salt of N-hydroxyethyl ethylenediamine triacetic acid, the sodium salt of N,N-di(hydroxyethyl) glycine, the sodium salt of N,N¹-dibenzyl ethylenediamine diacetic acid, the sodium salt of N-octadecyl ethylenediamine triacetic acid, the sodium salt of ethylenediamine diacetic acid; mixtures of the foregoing with one another or with triethanolamine; and the corresponding lithium, potassium, ammonium and primary amine salts of such compounds. It is not necessary that the chelating agent be of the classes suggested above, as others are capable of performing the same useful function.

The amount of chelating agent to be employed in the esterification reaction is very small, and amounts as little as 0.002 percent of the weight of epoxy resin have been found useful. Amounts as high as 1 percent or more of the weight of epoxy resin may be used, but possibly with some sacrifice in the clarity of the ester solutions and coatings. The preferred amount of chelating agent, on a dry weight basis, is from 0.005 to 0.10 percent of the weight of epoxy resin. The chelating agent may be employed as a dry solid, but it is more convenient to introduce it to the reaction mixture, or to one of the reagents to be used in that mixture, as an aqueous solution of from 25 to 75 percent concentration, by weight.

In carrying out the method of the invention, the epoxy resin, the esterifying acid and the chelating agent are mixed, and there is usually added a small amount of xylene to serve primarily as a means for removing the water formed during esterification as an azeotrope. The mixture is heated in a varnish kettle or equivalent vessel, and a stream of nitrogen is bubbled through the mixture to avoid oxidation during the course of the reaction. Conventional esterification temperatures are used, often near 240° to 260° C. When nearly the theoretical amount of water has been distilled from the reaction vessel, the cooking is continued until the acid number is in a satisfactory range which, for many uses, may be less than 1. The amount of acid used for the esterification reaction does not exceed the amount theoretically required to open and esterify the epoxy groups in the resin. For this reason it is necessary to know the "epoxy equivalent weight" of the resin. This may be determined in conventional manner, as by a preliminary esterification with a measured but excess quantity of a non-drying acid to determine the maximum number of equivalent weights of acid which can be neutralized by a known weight of the resin.

When the esterification is effected in the presence of an organic chelating agent in accordance with this invention, there is no gelation even when the acid number of the varnish is reduced below 1, and the color of the product is much more satisfactory than when the same reaction is effected in the absence of the chelating agent.

In a specific example, an epoxy resin which had been produced from "bisphenol-A" and epichlorohydrin and which had an epoxy equivalent weight of 848, was esterified with dehydrated castor oil acids. There was formed a mixture of 150 grams of the resin, 100 grams of the acids, and 50 grams of xylene. To this mixture was added 0.3 ml. of a 32 percent by weight solution of 2 parts of the sodium salt of ethylenediamine tetraacetic acid and 1 part of the sodium salt of N,N-di(hydroxyethyl) glycine. The mixture was heated to a reaction temperature near 255°–260° C., while a stream of nitrogen was bubbled through the liquid mass. The water evolved was collected and measured. When nearly the theoretical amount of water (about 3.0 g.) had been recovered, the acid number of the mixture was 2.36. This was reduced to 1.10 by heating for 20 minutes more, and to 0.72 within an hour. The varnish remained fluid and gel-free, even when heated for an additional hour, and remained light colored throughout. By way of contrast, the reaction was repeated with reagents from the same lots, but omitting the chelating agent. When 3.0 grams of water had been recovered, the acid number was 7.8, and this was reduced only to 1.6 by cooking for nearly 2 more hours, whereupon the reaction mass suddenly thickened and set up as a gel which was insoluble in xylene and useless for coating purposes. During the cooking procedure, the mass exhibited a dark green coloration.

The foregoing example was repeated in duplicate, with and without chelating agents, but using an epoxy resin having an epoxy equivalent weight of 1115. The same observations were made, namely, that the batch containing no chelating agent gelled and darkened, while that with a chelating agent remained fluid and gel-free below an acid number of 1, and was of acceptable light color and had satisfactory solubility in varnish thinners.

The gellation problem solved by the present invention is inherent in epoxy resins and becomes more aggravated as the epoxy equivalent weight is reduced, i. e., as the number of epoxy groups increases. The color problem referred to herein may not be inherent except in the case of resins made from reagents having certain (unknown) impurities. In any event, the present use of an organic chelating agent avoids or overcomes the troubles described.

We claim:

1. In the esterification of epoxy resins having oxirane rings and made by reaction of 4,4'-dihydroxydiphenyl dimethyl methane and epichlorohydrin, with unsaturated monocarboxylic acids derived from oils of the class consisting of drying and semidrying oils, the improvement which consists in carrying out the esterification reaction in the presence of a minor amount of a chelating agent from the group consisting of the tri- and tetrasodium salts of ethylenediamine tetraacetic acid, the sodium salt of N-hydroxyethyl ethylenediamine triacetic acid, the sodium salt of N,N-di(hydroxyethyl) glycine, the sodium salt of N,N'-dibenzyl ethylenediamine diacetic acid, the sodium salt of N-octadecyl ethylenediamine triacetic acid, the sodium salt of ethylenediamine diacetic acid, mixtures of the foregoing with triethanolamine, the corresponding lithium, potassium and ammonium salts of such compounds, and mixtures of the foregoing with one another.

2. The method of claim 1, wherein the chelating agent is a mixture of a water soluble salt of ethylenediamine tetraacetic acid and a water soluble salt of N,N-di(hydroxyethyl) glycine.

3. The method of claim 1, wherein the amount of chelating agent employed is from 0.002 to 1 percent of the weight of epoxy resin being esterified.

4. The method of claim 1, wherein the amount of chelating agent employed is from 0.005 to 0.10 percent of the weight of epoxy resin being esterified.

5. The method of claim 1, wherein the chelating agent comprises a water soluble salt of ethylenediamine tetraacetic acid.

6. The method of claim 1, wherein the chelating agent comprises a water soluble salt of N,N-di(hydroxyethyl) glycine.

References Cited in the file of this patent

UNITED STATES PATENTS

| | | |
|---|---|---|
| 2,493,486 | Greenlee | Jan. 30, 1950 |
| 2,652,376 | Rinse | Sept. 15, 1953 |
| 2,667,463 | Jakob et al. | Jan. 26, 1954 |

OTHER REFERENCES

Martell et al.: "Chemistry of the Metal Chelate Compounds," 2nd ed., Prentice-Hall, 1953.